Nov. 12, 1946.  E. H. WALTKE  2,410,848
MULTIPLE BARREL MACHINE GUN
Filed Dec. 15, 1943  8 Sheets-Sheet 1
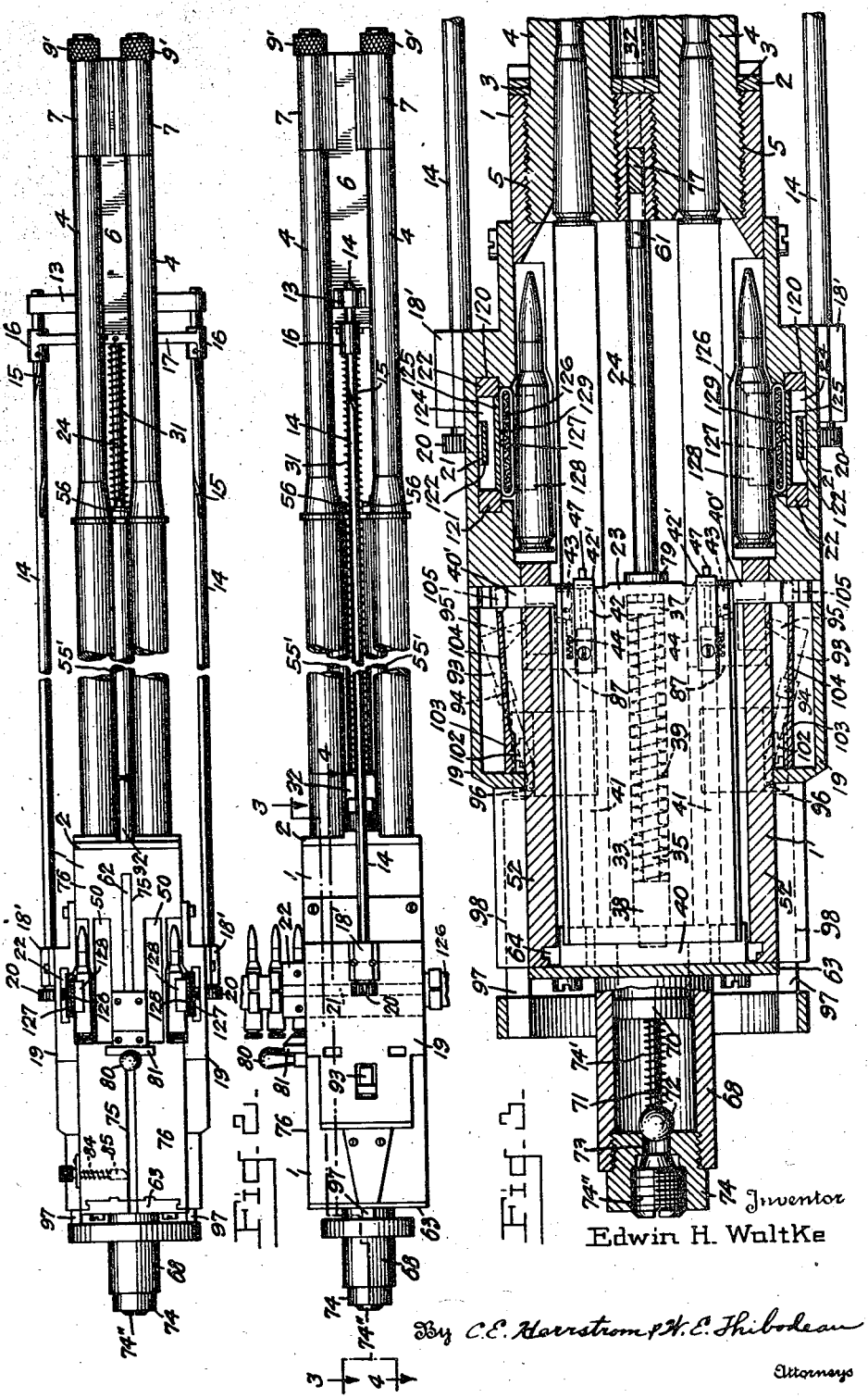
Inventor
Edwin H. Waltke
By C.E. Harrstrom & W.E. Thibodeau
Attorneys

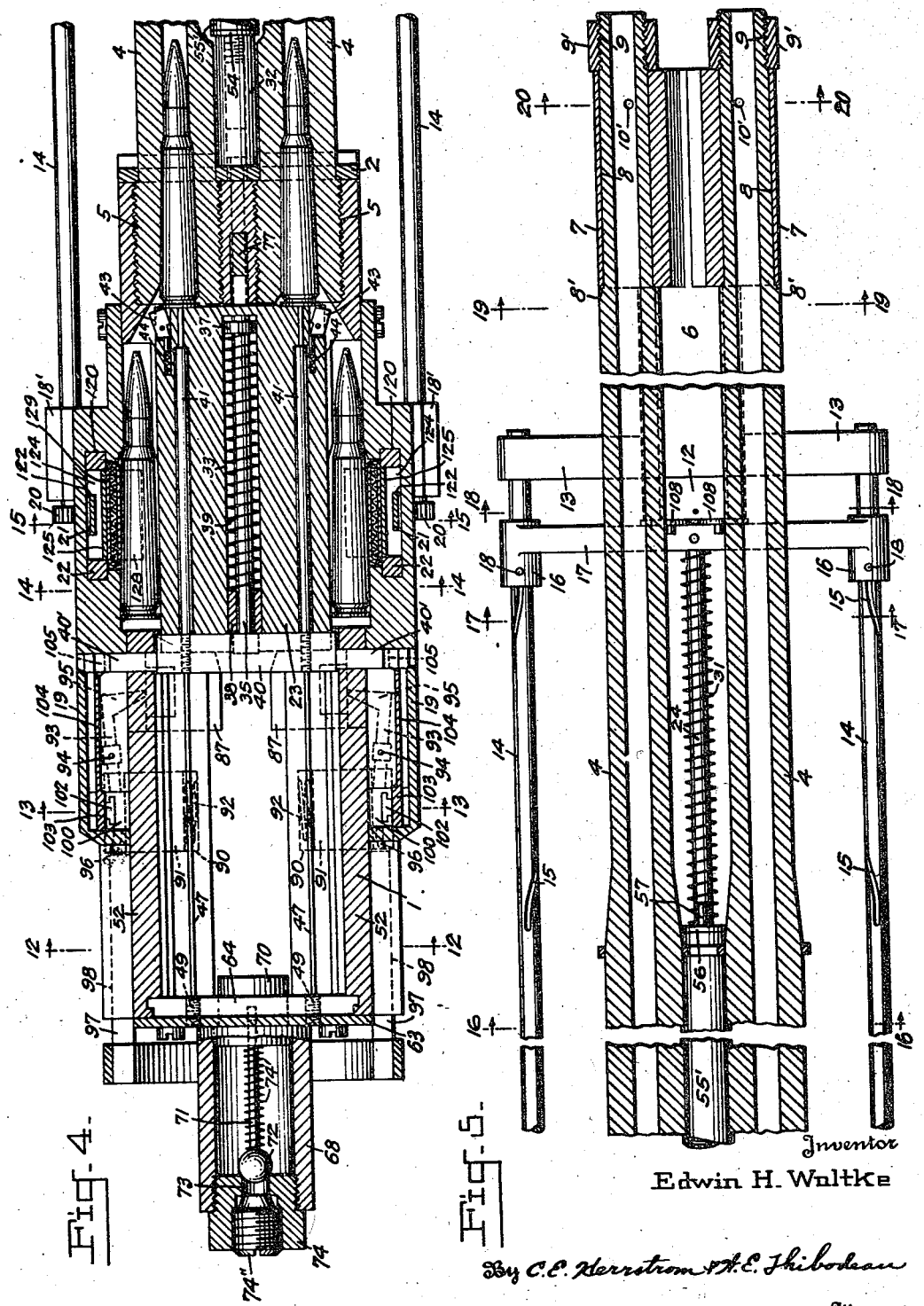

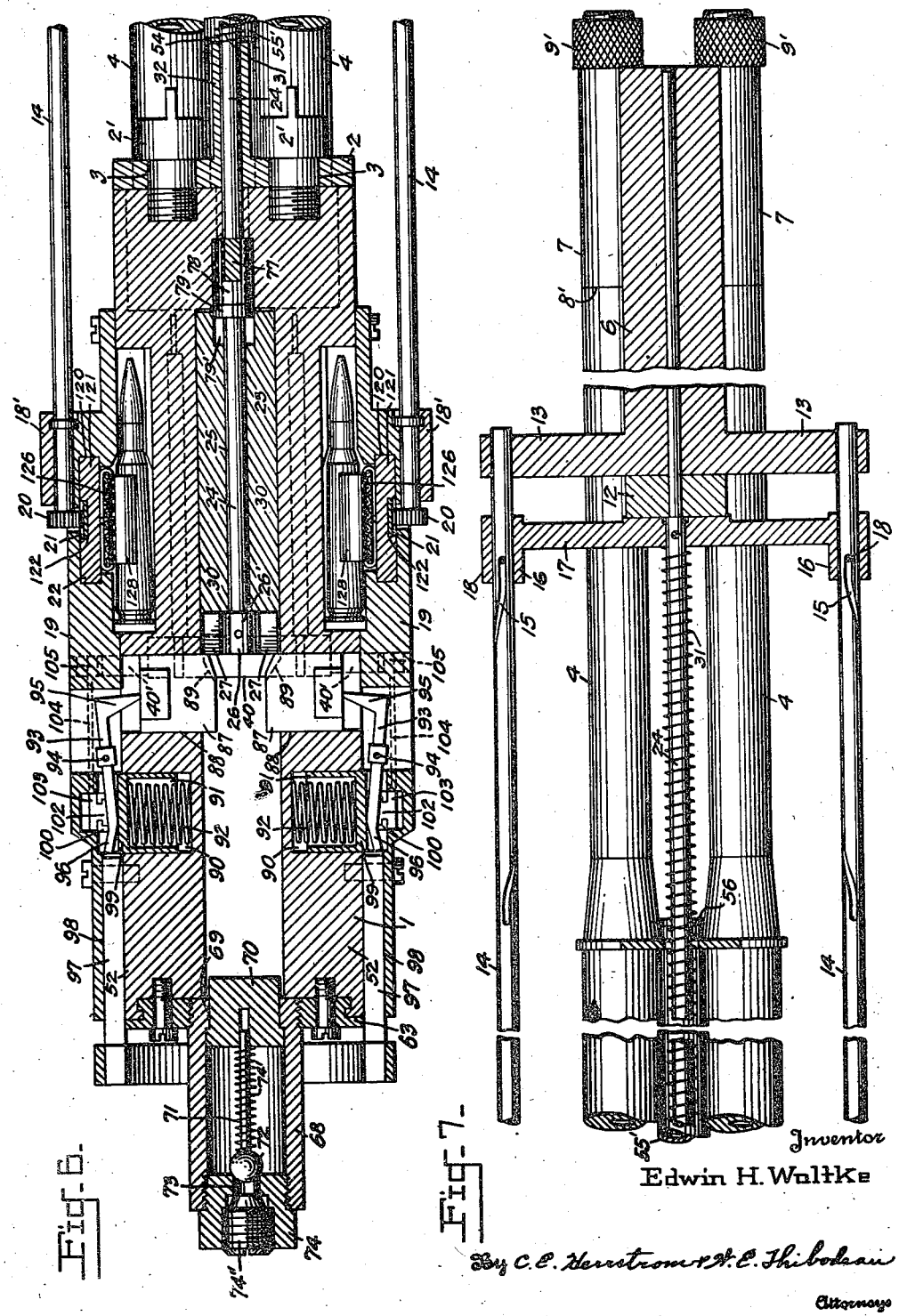

Nov. 12, 1946.    E. H. WALTKE    2,410,848
MULTIPLE BARREL MACHINE GUN
Filed Dec. 15, 1943    8 Sheets-Sheet 4

Inventor
Edwin H. Waltke
By C. C. Hemstrom & H. E. Thibodeau
Attorneys

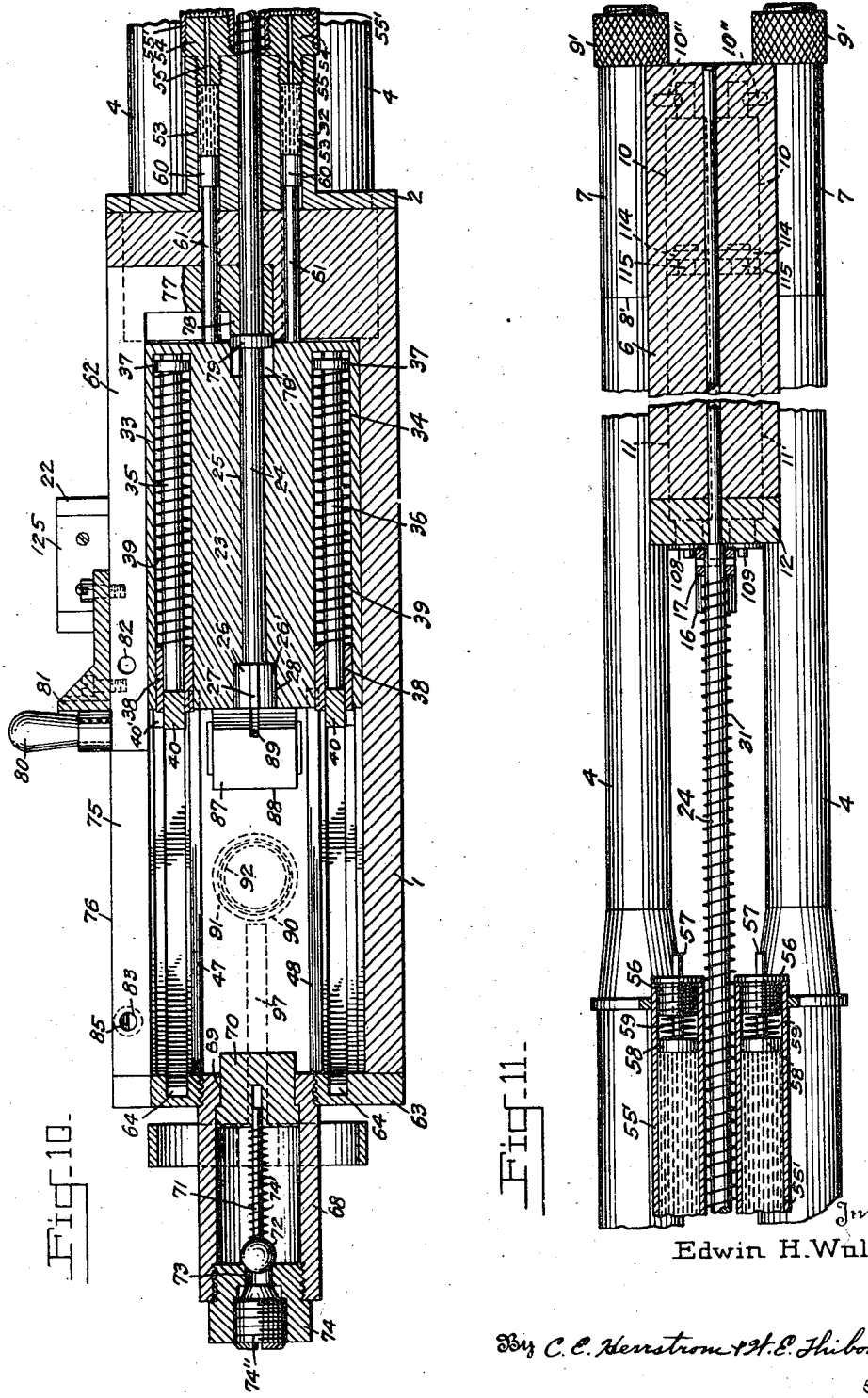

Nov. 12, 1946.  E. H. WALTKE  2,410,848
MULTIPLE BARREL MACHINE GUN
Filed Dec. 15, 1943  8 Sheets-Sheet 6

Inventor
Edwin H. Waltke
By C. E. Kerrstrom & H. E. Thibodeau
Attorneys

Nov. 12, 1946.　　　　E. H. WALTKE　　　　2,410,848
MULTIPLE BARREL MACHINE GUN
Filed Dec. 15, 1943　　　　8 Sheets-Sheet 7
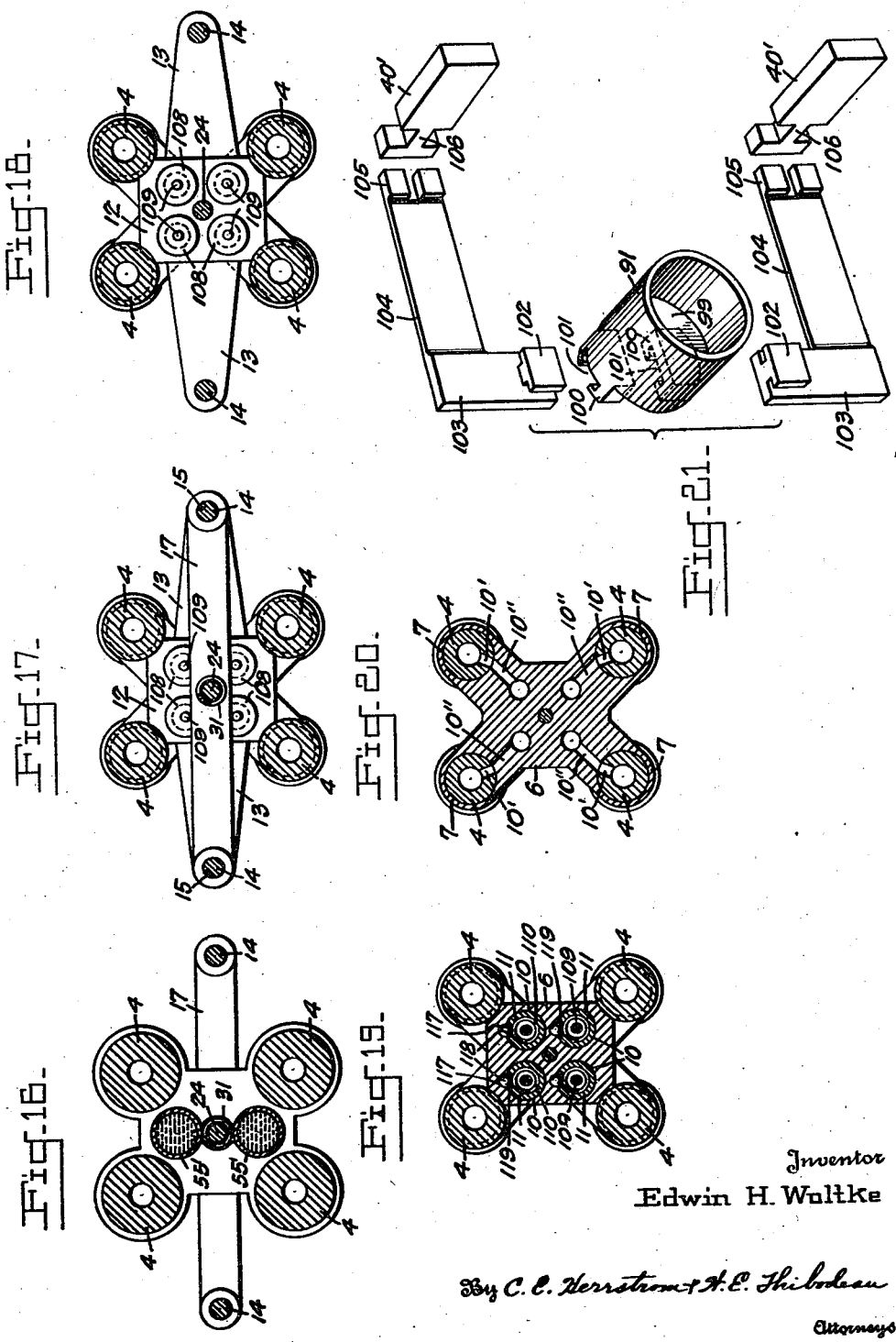
Inventor
Edwin H. Waltke

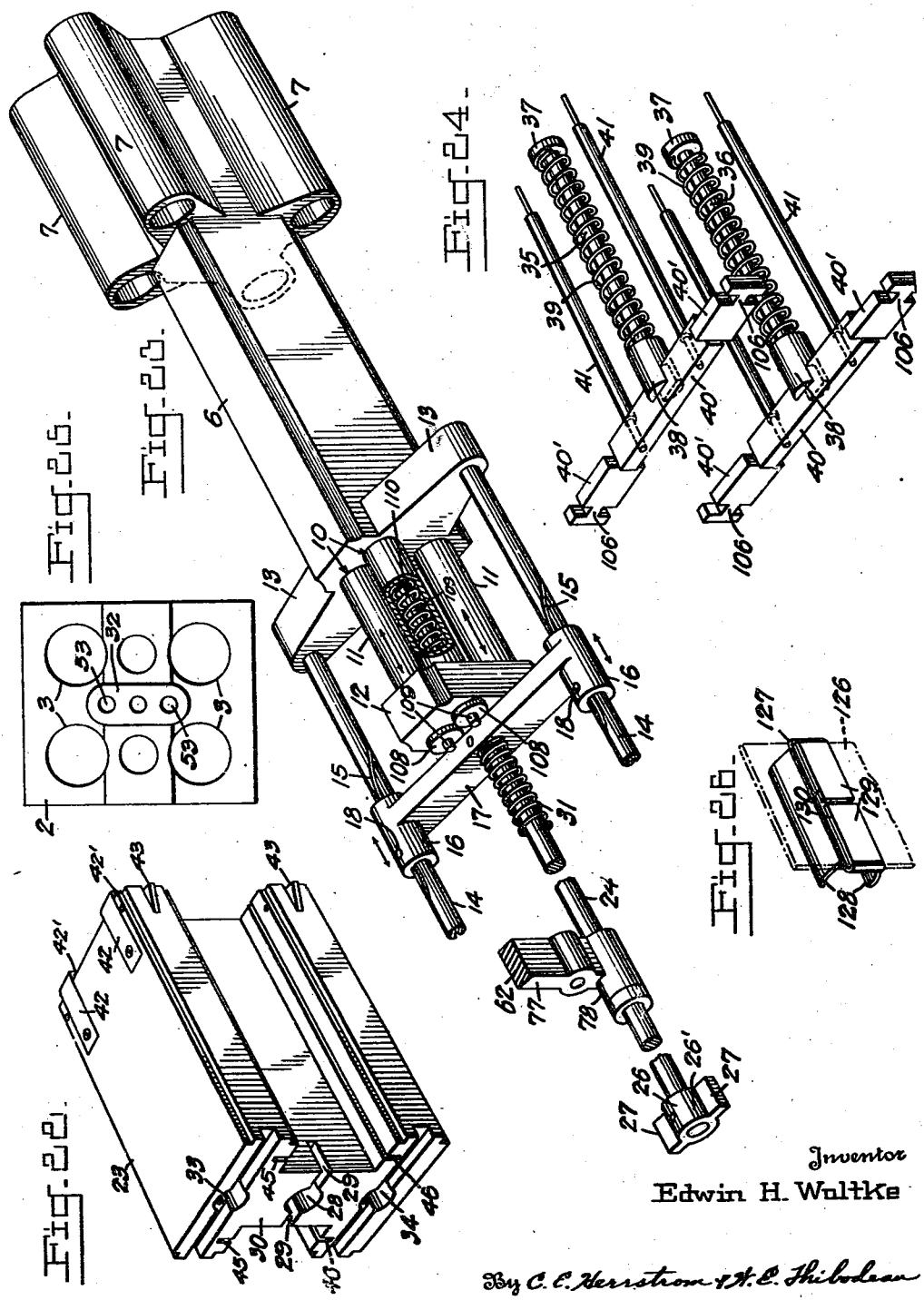

Patented Nov. 12, 1946

2,410,848

UNITED STATES PATENT OFFICE 2,410,848

MULTIPLE BARREL MACHINE GUN

Edwin H. Waltke, Los Angeles, Calif.

Application December 15, 1943, Serial No. 514,359

5 Claims. (Cl. 89—2)

(Granted under the act of March 3, 1883, as amended April 30, 1928; 370 O. G. 757)

The invention described herein may be manufactured and used by or for the Government for governmental purposes without the payment to me of any royalty thereon.

This invention relates to a multi-barrel gas-operated machine gun.

A primary object is to provide a gun that will be capable of a high rate of fire, and one that will be durable and compact and of light weight with a minimum number of parts, making it especially adaptable as an aircraft gun, or as an antiaircraft weapon, and one that can be operated with a minimum of effort.

In a multi-barrel automatic gun, it is important that provision is made to fire simultaneously all of the barrels, or as many as are intended to be so fired, but if there should be a misfire or a hangfire, it is important that the breech block remain closed to eliminate the possibility of an explosion taking place while the breech block is being opened, which explosion might be caused by the explosion of the other cartridges. Therefore, one of the important objects of this invention is to provide a gun in which the movement of the breech block will be prevented should one or more of the cartridges, for any reason, not be exploded. In accomplishing this object, the gas from each barrel is made to operate its own piston, and each piston is connected with the others, so that they can only move in unison, or in other words, if one piston is locked the others can not operate even though the gas that operates them under normal conditions, impinges against them.

The gun illustrated has four barrels, but it is not to be considered as merely two twin-barrel automatics combined in one, inasmuch as a greater compactness of design and lightness of weight per barrel, has been accomplished, as well as the employment of a one-piece breech block contributing to the simplicity of construction, as well as durability.

So far as I am aware, the gun about to be described is the first to employ four barrels, loaded simultaneously, fired in the same way, automatically, and repeatedly, deriving its power from the gas from the explosion of the cartridges, and so constructed that the parts act as a single mechanical unit under a single control, and to provide a gun in which in case of misfire or hangfire, the breech block will remain locked unless all the barrels fire.

In the drawings illustrating the invention:

Figure 1 is a top plan view of the gun.

Figure 2 is a side elevation.

Figure 3 is a horizontal section about on the line 3—3 of Figures 2 and 12, the breech block being in elevation and rear position.

Figure 4 is a horizontal section about on line 4—4 of Figures 2 and 12 with the breech block in battery position, the firing pin bars and sears being in plan.

Figure 5 is a similar view showing a forward continuation of Figure 4.

Figure 6 is a horizontal longitudinal section taken through the center of the breech block and midway between the upper and lower barrels, or about on line 6—6 of Figure 12, the breech locks being in plan.

Figure 7 is a forward continuation of Figure 6.

Figure 10 is a vertical longitudinal section through the center of the gun about on line 10—10 of Figure 12.

Figure 11 is a continuation of the forward part of Figure 10.

Figure 16 is a cross section on the line 16—16 of Figure 5.

Figure 17 is a cross section on the line 17—17 of Figure 5.

Figure 18 is a cross section on the line 18—18 of Figure 5.

Figure 19 is a cross section on the line 19—19 of Figure 5.

Figure 20 is a cross section on the line 20—20 of Figure 5.

Figure 21 is an exploded view of the main portions of the sear mechanism appropriate to the left hand set of barrels, which mechanism is duplicated in respect to the right hand barrels.

Figure 22 is a perspective view of the breech block.

Figure 23 is a perspective view of the barrel brace, piston connector head, breech block driving rod, and some associated parts, the cross head and pistons being in the position they occupy in partial recoil of the block.

Figure 24 is a perspective view of the firing pin assembly and their respective sears, the sears and firing pin bar being in fired position.

Figure 25 is a face view of the front plate of the receiver.

Figure 26 is a perspective view of one cartridge clip showing a portion of a cartridge belt in dotted lines.

Figure 8:
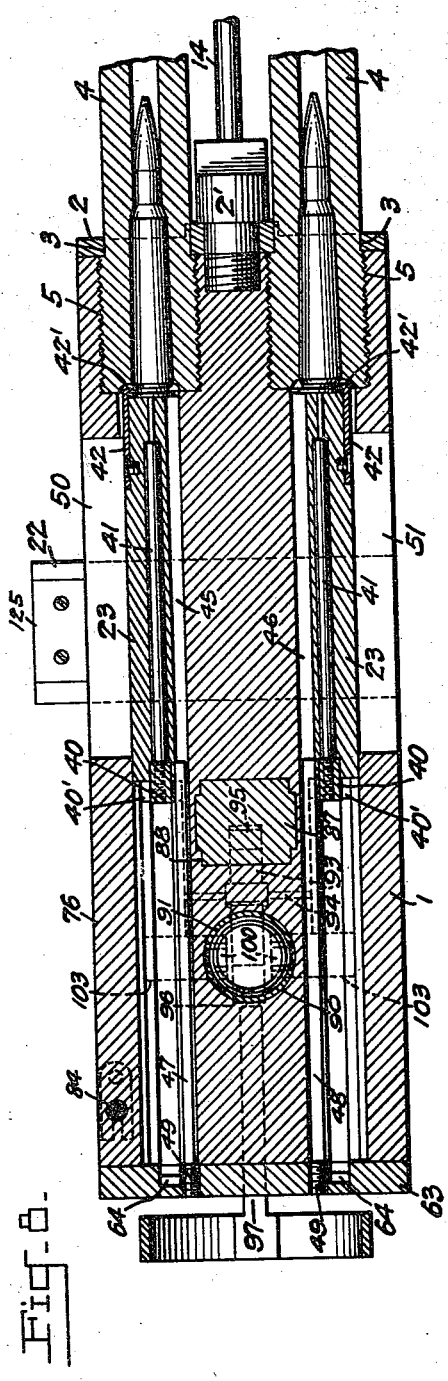
Figure 8 is a vertical, longitudinal section through the left hand barrels, or about on line 8—8 of Figure 14.

Referring to the drawings, and first to Figures 1, 2, 22 and 23, the numeral 1 designates the receiver of the gun, having front plate 2 secured to it by oppositely disposed bolts 2', Figure 6. This plate has four circular openings 3 for the passage of the breech portions of four identical barrels 4, which are threaded into the receiver as at 5. The muzzle ends of the barrels are provided with a stationary barrel-brace 6 which has preferably integral therewith, four parallel cylinders 7, through which the barrel ends extend. The barrels are preferably slightly reduced in diameter at their muzzle ends as at 8, forming shallow shoulders 8' against which the rear ends of the cylinders abut, as shown in Figure 5. Threaded portions 9, of the barrels receive knurled nuts 9' that are screwed against the forward ends of the cylinders and serve to firmly secure the barrels to the barrel brace, of which the cylinders form an integral part.

Figure 9:
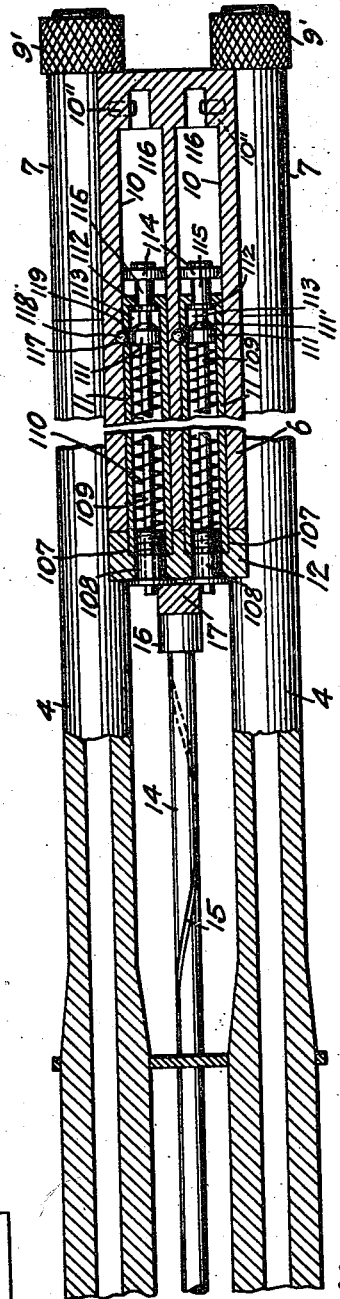
Figure 9 is a forward extension of Figure 8, showing in vertical section, a portion of the safety locking mechanism for the breech block, appropriate to the left hand of barrels.
Figure 13:
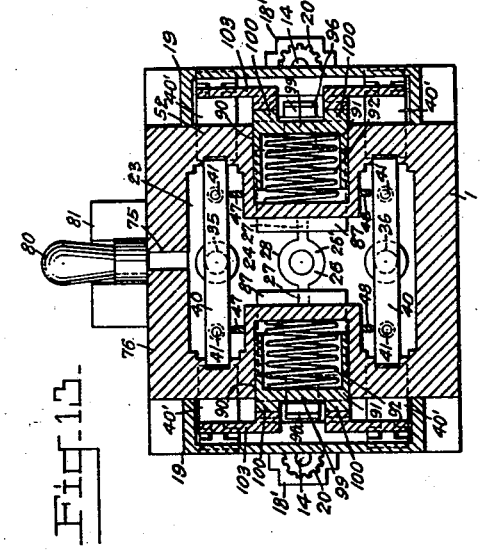
Figure 13 is a cross section on the line 13—13 of Figure 4, the ends of the breech block levers being in elevation.

There are four bores 10 (Figures 9, 19 and 23) in the body of the barrel-brace, each in communication with a barrel bore through gas ports 10' which register with short radial conduits 10" in the forward end of the barrel brace, Figures 5, 9, and 20. There is a bore for each barrel, and parallel with each barrel, and each bore contains a long hollow piston 11, each one of which is secured at its rear end to a connector-head 12, common to all of the pistons, as well shown in Figure 23. The bores 10 are of such length as to accommodate the pistons, and at the same time provide gas chambers, that receive the gas for moving the pistons and the parts actuated thereby. The positions of the head and pistons as shown in this view are not in their normal positions, although they sometimes occupy them, the normal position of the head being against the rear end of the barrel brace, with the pistons inside the brace. These pistons and bores and their closely associated parts constitute an important feature of the invention, and will presently be described in detail.

Two identical laterally extending arms 13, appearing frequently throughout the figures, are integral with the rear end of the barrel-brace 6, and in their extremities are oscillatably mounted oppositely disposed parallel belt-feed-rods 14, of which there are two, each provided with a spiral cam groove 15. The hubs 16 of a reciprocable cross head 17, surround the rods, and pins 18 entering the grooves cause the oscillation of the rods during the reciprocation of the cross head. The cross-head is always against the rear face of the connector-head 12, it being held there by the breech-block drive rod spring as will more fully appear.

The belt feed rods 14 extend rearwardly for a considerable distance beyond the front end of the receiver, and their rear ends have bearings in brackets 18' mounted on identical side plates 19, that close the recesses in the sides of the receiver and house important mechanism that will a little later on be described. The rear end of each rod carries a pinion 20 arranged to engage racks 21 (Fig. 15) of identical feed slides 22, mounted for simultaneous vertical movement inside the said housing plates of the receiver.

The numeral 23 designates the breech block, appearing in many places and in several positions throughout the drawings, but in its completeness, it is best shown in Figure 22. There is a breech block drive-rod 24 securely fastened centrally to the cross head 17, and extends entirely through and fits in a central bore 25 in the breech block. The rear end of the drive-rod is fitted with a member 26 having a cylindrical portion 26' and laterally extending wings 27, the cylindrical portion fitting a correspondingly shaped seat 28, in the block and the wing portions fitting into the kerfs 29 in the narrow central portion 30 of the block. These laterally extending wings engage the laterally movable breech-block locks later to be described, upon which they have a camming action upon the initial rearward movement of the breech block, to force the locks out of the path of movement of the block.

A spiral spring 31 surrounds the breech block drive-rod and is interposed between the cross-head 17 and the face of a vertical boss 32, integral with the front face of the front plate 2 of the receiver (Figs. 6 and 25). This spring normally holds the cross head 17 against the connector head 12, and consequently the hollow pistons normally housed in the barrel-brace 6, and returns the cross-head and pistons to normal position, and consequently the breech block to battery position. In addition to the central bore 25, the block is provided with bores 33 and 34 for the accommodation of identical firing-pin rods 35 and 36 (Figs. 10, 22, and 24) each provided at its forward end with a washer 37 fixed on the rods and between which and a bifurcated head 38 on each rod, is interposed a spiral firing spring 39. Received in the bifurcated end 38 of each rod is a transverse firing pin bar 40, each carrying two firing pins 41 (Figs. 8 and 24) two for the upper barrels and two for the lower, and the four ends of these bars cooperate with sears 40', of which there are four, two for each firing pin bar.

On the forward end of the breech block there are four extractors 42 of resilient material (Figs. 8 and 22) the working ends of two facing downwardly for extracting the shells from the upper barrels, and the ends of the lower two facing upwardly for extracting the shells from the lower barrels. The working ends 42' of the extractors snap into the cannelures of the cartridges in the usual way, in position to extract the cartridges upon the rearward movement of the breech block. Adjacent the upper and lower front corners of the breech block, are pivoted four cartridge feed pawls 43 (Figs. 4 and 22) the pawls being pivoted in recesses in which there are springs 44, acting upon the pawls to keep them normally slightly extended beyond the lateral edges of the breech block in position to engage their appropriate cartridges to force them out of their clips and into the appropriate chambers as the breech block moves forward.

Figure 15:
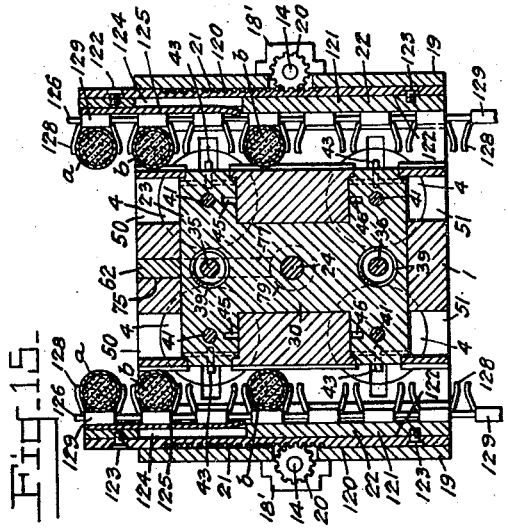
Figure 15 is a cross section on the line 15—15 of Figure 4.
Figure 12:
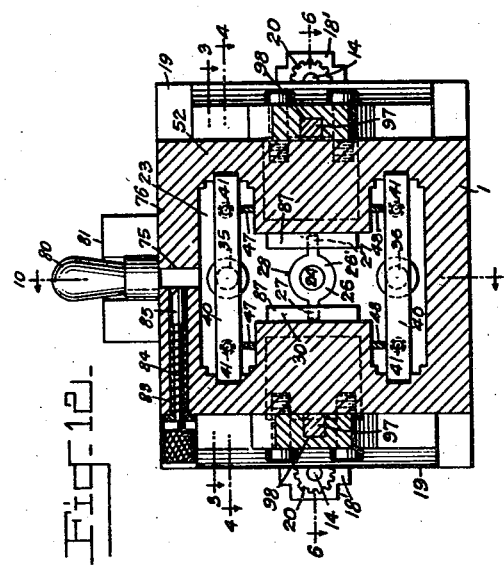
Figure 12 is a cross section on line 12—12 of Figure 4.
Figure 14:
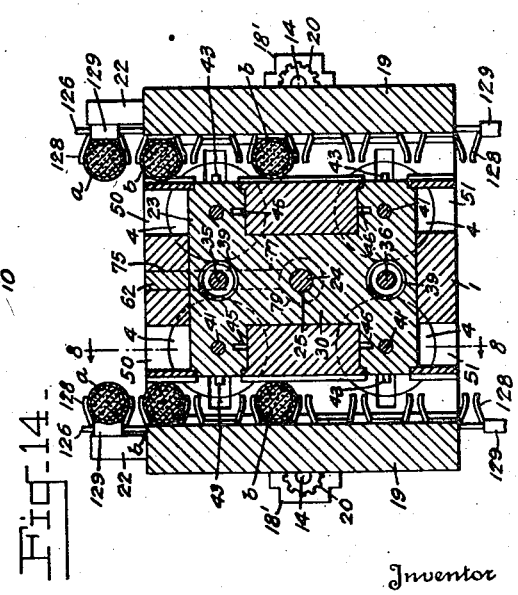
Figure 14 is a cross section on the line 14—14 of Figure 4.

The upper and lower laterally extending portions of the breech block are provided respectively with downwardly opening grooves 45, and similar upwardly opening grooves 46, for the passage and guidance of four identical ejector rods 47 and 48 (Figs. 8 and 22) secured at 49 to the rear plate 63 of the receiver, the arrangement being such that the heads of all the cartridge shells will be simultaneously engaged on their inner edges when the breech block, with its extracted shells, has moved rearwardly sufficiently to have fully extracted the shells from the cartridge chambers. This engagement between the ejectors and the shell heads will forcefully tilt the shells and eject those from the upper barrels out of the upper receiver openings 50, and those from the lower barrels downwardly through the lower openings 51 of the receiver (Figs. 8, 14 and 15). It will be noted particularly from Figs. 12 to 15 that the external configuration of the breech block and the interior of the rear portion of the receiver in which the block reciprocates during approximately half of its movements, agree closely thereby fully supporting the block and guiding it in its reciprocating movements, making it unnecessary to describe in detail the shape of the portions of this part of the receiver that forms tracks and supports for the block.

*Buffer mechanism.*—Two bores 53 (Figs. 10 and 25) are provided in the boss 32 on the front plate 2 of the receiver, to receive a suitable fluid such as oil. Threaded into these bores are the nipples of exteriorly threaded plugs 54, there being conduits 55 through the plugs connecting them with the fluid filled buffer cylinders 55', Figure 11, whose forward ends are closed by centrally apertured plugs 56, the apertures being for the passage of the rods 57 of pistons 58, between which pistons and said plugs are interposed spiral springs 59 to buff the fluid in said cylinders. Pistons 60, Figure 10, work in the bores 53 and their rods 61 extend rearwardly through the front portion of the receiver and into the forward end of the breech block chamber of the receiver, where they are in position to be engaged by the breech block to buff the block as it approaches battery position in the receiver. As best shown in Figure 10, the rear plate 63 of the receiver is provided with upper and lower transverse recesses 64, for the reception of the firing pin bars 40, when the breech block is in its extreme rearward recoil position. A single buffer cylinder 68 is threaded into the rear plate 63 of the receiver, and in a shouldered aperture 69 in the forward end of the cylinder is a slidable shouldered buffer plug 70, having a central recess for the reception of a rod 71 of a ball valve 72, normally held seated in an orifice 73, in a screw plug 74, threaded into the cylinder. A spring 74' surrounding the rod and interposed between the slidable and stationary plugs holds the ball seated in the orifice 73. A fluid, air, under pressure, is contained in the buffer cylinder, introduced therein through the orifice 73, which is available for the introduction of such fluid upon removal of the threaded closure plug 74". Just before the breech block reaches its final rearward position, to which it is forced by the gun gases through the instrumentality of the pistons 11 (Figs. 9 and 23) and the breech block drive rod 24, its rear end engages the forward end of the slidable plug 70 which, yielding against the contained pressure in the cylinder, effects the buffing of the block. After this buffing action, the block is returned to battery position by the breech block drive rod spring 31, interposed between the cross head 17 and the boss 32 on the front plate of the receiver.

*Breech-block operating rod.*—The manual operating rod 62 (Fig. 10), slides in recess 75 in the top portion 76 of the receiver, and is formed with a downwardly extending front end 77 which has a return portion 78 for engagement with disk 79 on the breech block drive rod 24. This disk is received in a central recess 79' in the breech block when the operating rod 62 is manually manipulated to "cock" the gun and also when the gun is operating automatically. The rearward movement of the operating rod forces the disk into the recess 79' in the block and permits some lost motion between the block and the drive rod, so that the rear end of the drive rod will be projected beyond the rear end of the block to force the breech block locks laterally out of the way of the breech block. The operating rod (Fig. 10), has a handle 80, and on the receiver there is a stop 81, against which the handle rests when the block is in battery position. There is a hole 82 adapted to register with the inner end of a bore 83 in the receiver (Fig. 12) through which extends a spring-backed pin 84. The pin has a head 85 which is received in the hole 82, to latch the block in its rearward position, there being on the outer end of the pin a knurled knob by which the latch may be conveniently manipulated.

*Firing mechanism.*—Referring particularly to Figure 6, the numeral 87 designates two identical breech-block locks. These are oppositely disposed and slidably mounted in recesses 88 in the sides of the receiver. They are provided on their inner forward edges with cam surfaces 89 which are engaged by the wings 27 of the breech block drive rod 24 (Figs. 6, 13 and 23) upon the rearward movement of the drive rod. Rearward of the locks 87 are oppositely disposed recesses 90 in the side portions 52 of the receiver, and slidably mounted in each recess is a cup-shaped spring seat 91 for a spring 92. Interposed between the seats and the breech-block locks 87 are levers 93 of which there are two. These levers are pivoted about midway of their length at 94, in recesses in the sides of the receiver. The forward ends of the levers form fingers 95 which at all times, under the urge of springs 92, are in contact with the breech-block locks 87. The rear ends 96 of these levers are bent slightly outwardly so that their outer sides will be normally in the path of movement of the oppositely disposed parallel trigger rods 97 (Fig. 6) slidably mounted in guide ways 98 in the side plates 19 of the receiver, but arranged to be rocked out of said path when the breech-block locks 87 are forced apart upon the rearward movement of the breech block drive rod 24. Referring particularly to Figure 21, where the cup shaped spring seat is more clearly shown than elsewhere, it is shown to have a closed end 99, and is provided with upper and lower extension 100, each having a T-shaped slot 101 therein, the slots being in perfect vertical alignment with each other. These slots receive and hold complementally shaped extensions 102, integral with vertical portions 103 of sear control arms 104, the forward ends 105 of which are bifurcated to receive the reduced parts 106 of the sears 40'. Particular attention is called at this point to the fact that the major portions of the sear control arms are of resilient material, so that in certain operations the portions will flex, and due to the resiliency of the arms, constant pressure is exerted upon the sears, as will appear.

The arrangement must be and is such that during a portion of the rearward movement of the breech block, the sears are projected into the path of movement of the firing pin bars 40. Near the end of the forward movement of the breech block, these bars come into contact with the ends of the inwardly urged sears, and upon further forward movement of the breech block, the firing pin bars catch behind the sears, and upon still further forward movement of the breech block, the firing pin springs 39 are compressed and remain so until released by the sears, which occurs at the instant of firing.

On counterrecoil of the breech block the firing pin bars 40 are caught and held by the sears 40', and upon further movement in counterrecoil the trigger springs are compressed and at this time the breech block locks 87 are returned to locking position behind the breech block. These locks are returned to their normal position by the pressure of the springs 92 in the spring seat cups 91. The outward movement of the cups, which carry the sear control arms 104, (Figs. 6 and 21) will impart a similar movement to the sears, removing them from in front of the firing pin bars thus releasing them and permitting them to move forward under the urge of the firing springs, to fire the gun. The inward movement of the sears, which takes place at the forward ends of the sear control arms, is less than the movement of the rear ends of said arms, and during this differential movement, the resiliency of the arm 104 keeps a constant pressure on the sears, tending to force them inwardly against the sides of the breech block and into the path of the bars 40.

*Safety locking means for the breech block.*—The means for preventing the movement of the breech block from locked position upon the occasion of a misfire or hangfire of one or more of the cartridges, will now be described, in greater detail than before.

Upon firing the gun, gas is admitted simultaneously through ports 10' and conduits 10" to all of the bores 10 (Fig. 9), in which the hollow pistons 11 simultaneously reciprocate upon the firing of all the barrels. The rear ends of the pistons are seated in recesses 107 in the connector-head 12 and screw plugs 108 are threaded into the ends of the pistons and secure them in place in the head. These plugs are apertured for the passage of rods 109 surrounded by springs 110, which are interposed between said plugs 108 and heads 111, fastened on the rods. Fixed to the rods and forward of the heads 111 are disks 112, the disks and heads being spaced to form pockets 113. Outside of the pistons are auxiliary pistons 114, integral with extensions 115 of the rods 109. The pistons 11 are positioned in the rearward ends of the bores 10, thus, leaving cylindrical chambers 116 for simultaneously receiving the gas from all of the gun barrels through ports 10' and conduits 10". In the upper wall of each bore is a spherical pocket 117 which receives locking balls 118, extending through holes 119 in the walls of the pistons and normally in contact with the cylindrical portions of the heads 111, each formed with a conical face 111'. As intimated, when all of the barrels fire in unison, which is to be expected, the gas from each barrel, coming into the chambers 116, presses simultaneously against the auxiliary pistons 114 and forces them rearwardly, which movement carries their heads 111 and disks 112 rearwardly. This movement brings the shifting pockets 113 directly below the balls 118 which, by gravity, drop into the pockets and unlock the pistons 11, allowing all of them to move rearwardly together with their connector-head 12 (Figs. 9 and 23) to actuate the breech-block drive rod 24, and also cross-head 17 that oscillates the belt feed rods 14. However, should a barrel fail to fire and, therefore, deliver no gas to its particular bore in the barrel brace 6, its piston 11 will not be operated, and if the piston its not operated, its particular ball remains in contact with the cylindrical portion of the head 111 and holds the piston locked to the wall of its bore. The gases from the barrels that fired will then escape through the bores 10" in the end of the barrel brace and through the conduits and ports connecting the barrels with the chambers 116.

*Cartridge belt feed.*—As we have seen, there are two belt feed rods rotatably mounted in the ends of the laterally extending arms 13 of the barrel brace 6, each having a spiral cam groove 15 entered by a pin 18 in the hubs 16 of cross heads 17, through which hubs the rods slidably pass so that oscillatory movement is given the rods upon the reciprocation of the cross heads, which through pinions 20, engaging racks 21 on oppositely disposed feed slides 22, cause the vertical reciprocation of said slides. The slides move vertically in guideways 120 (Figs. 3 and 15), in the sides of the receiver. The feed slides and cartridge belts are identical and description of one will serve for both. The slide comprises a plate 121 (Fig. 6), having a central vertical recess 122 for the reception of the rack which may be secured to the plate by short screws 123. The plate has a rectangular opening 124 in its upper portion to make a clearance for a resilient feed pawl 125, whose upper end is fastened, by any suitable means, in a recess similar to the recess 122 that receives the rack.

The cartridge belt comprises a strip 126 of suitable flexible material, to which is attached at appropriate intervals, sufficiently resilient metallic clips 127 having lips 128 to grip the cartridges, and tabs 129 that are bent sharply around the flexible strip (Fig. 26), to fasten the clips. The upper edges of the bent tabs form a long shoulder 130, engaged by the lower edge of the feed-pawl 125 upon the downward movement of the feed slide, to feed the cartridges when the slide is operated in feeding direction, by the belt feed rod. The two slides are operated in unison as the feed rods are oscillated, and the slides are so timed and the cartridges are so positioned, on the belt, that alternate cartridges are fed to the four barrels on every downward movement of the slide. For instance, as seen in Figs. 14 and 15, upon the downward movement of the slide, the cartridges *a* will be fed to the upper barrels and the cartridges *b* to the lower barrels, the belt moving the distance of two cartridges upon each downward movement.

When the cartridges reach the levels of the barrel bores, they are forced forward by the cartridge feed pawls 43 on the breech block (Figs. 4 and 24), and stripped from their clips, which sustain them both laterally and longitudinally until their projectile ends engage the inclined walls 131 of the receiver, when a further movement of the breech block will force them simultaneously into the cartridge chambers of the barrels.

*Operation.*—The cartridge belts, suitably supported from above the receiver, are placed in the receiver in position to be further fed by the feed slides. The operating arm 62, is pulled back, taking with it the breech block drive rod 24 which, in turn, will take with it the breech-block and cross-head 17 connected with the drive rod. Upon the initial rearward movement of the drive rod the wings 27 on the member 26 pinned to the rear end of the drive rod 24, will force the breech-block locks 87, out of the way of the block against the pressure of springs 92, (Fig. 6) exerted through the levers 93. The rearward movement of the breech block drive rod 24 will cause the cross-head 17 to rotate the belt feed rods 14, which will, through pinions 20, operate the cartridge feed slides 121 downward to feed the cartridges to position to be engaged by the cartridge feed pawls 43. On the forward movement of the breech block, the pawls simultaneously engage the four cartridges and strip them from their clips, and the breech block travelling further forward will force the projectile ends of the cartridges against the inclined walls of the receiver, Fig. 3, when the cartridges will be deflected into the chambers of the barrels. During the last part of the movement of the breech block, the firing-pin springs 39 have been placed under tension by engagement of the sears 40' with the firing-pin bars 40, and upon the release of said bars and their firing pins, which is at the moment the breech block has reached the limit of its forward movement, or battery position, all four barrels will be fired. From this time on, unless intentionally interrupted, the gun will operate automatically; due to the gas pressure from the barrels entering the chambers 116 (Fig. 9).

When it is desired to stop the automatic action of the gun, the trigger bars 97 (Fig. 3) are thrust forward and engage the outer sides of the levers 93, thereby arresting the rocking movement of said levers, which rocking movement has characterized the levers during the automatic action of the gun. This forward operation of the trigger-bars 97, will cause the sears to be held inwardly to their fullest extent, wherein they are in engagement with the sides of the breech block, with the firing-pin springs under compression, said springs having been placed under compression when the firing pin bars were arrested by the sears. When the breech block reaches its extreme forward position after the operation of the trigger bars, the gun will not fire, but the firing pin springs remain compressed. When the trigger-bars are moved rearwardly the sears 40' are moved outwardly releasing the firing-pin bars 40 and firing the gun, after which the gun resumes automatic action. To be a little more specific, when it is desired to resume firing, the trigger bars 97 are moved rearwardly, freeing the lever arms 96. In so doing, the springs 92 force the sear control arms 104 (Fig. 21) outwardly, carrying with them the sears from in front of the firing pin bars 40. This same procedure may be followed in initially starting the gun, in that whenever the trigger-bars 97 lock the levers 93, in the above described position, it will be impossible to fire the gun.

Referring particularly to Figure 9, in which the safety locking means is illustrated more clearly than elsewhere, it will be seen that gas entering the four chambers 116, simultaneously, will first impinge against the auxiliary pistons 114, forcing the rods 109 rearwardly against the tension of springs 110. This movement of the rods shifts the pockets 113 to a position to receive the balls 118, which are no longer supported by the cylindrical portions of the heads 111. At this point the rods are simultaneously unlocked and all of the pistons 11 can move rearwardly. However, as heretofore explained, should one of the chambers 116, for any reason fail to receive gas from a barrel, the piston appropriate to that barrel will be locked, and since all the pistons are connected for joint movement only, all the pistons will be locked and consequently there will be no movement imparted to the breech block through the breech-block rod 24, or to the cartridge feed mechanism. This is because until the heads 111 move rearwardly, the ball 118 cannot move down out of the position in which they lock the pistons 11 against the walls of the bores in which the pistons move.

It will be understood that the gun will be suitably mounted on a suitable support that will permit the elevational and transverse trainings, and the cartridge belt will be appropriately supported and fed to the belt feed mechanism in a practical manner with a minimum of strain upon the belt in the various trained positions of the gun.

I claim:

1. In a multi-barrel gas operated gun, a receiver, a plurality of barrels fixed relative to the receiver, a breech block reciprocable in the receiver and common to all of the barrels, a body having gas chambers in communication with the barrels, breech block actuating means, releasable means associated with each chamber for independently locking said breech block actuating means in inoperative position, and means operated by the gas in each chamber to release each of said locking means and to operate said breech block actuating means, whereby said breech block will be actuated only when gas simultaneously enters all of said chambers.

2. In a multi-barrel gas operated gun, a receiver, a plurality of barrels fixedly mounted relative to the receiver, a breech block reciprocable in the receiver and common to all of the barrels, a body mounted forward of the receiver and having a plurality of bores, one for each barrel, a portion of each bore forming a gas chamber in communication with a barrel of the gun, pistons in said bores, means for locking the pistons therein, said means operable to release the pistons only upon entry of gas simultaneously into all of the gas chambers, means for connecting the pistons for joint movement only, and operative connections between the pistons and the breech block for reciprocating the block upon entry of gas into the gas chambers of said bores.

3. In a multi-barrel gas operated gun, a receiver, a single breech block reciprocable in said receiver, four barrels secured to the receiver in sets of two, one set above the other, and each barrel being provided with a gas outlet port, a barrel brace in advance of the receiver having means for supporting and bracing the barrels, said brace comprising a body having four bores therein, one for each barrel, a part of each bore forming a chamber in communication with a barrel through its port, a piston in the rear portion of each bore, a connector head outside the bores connecting the pistons for joint movement only, reciprocable means for normally locking the pistons in the bores, said means being releasable by the gas from the barrels and only when the gas is received in the chambers simultaneously from all of the barrels, and an operative connection between the breech block and connector head, whereby the breech block is reciprocated.

4. In a multi-barrel gas operated gun, a plurality of barrels, each provided with a gas port, a breech block, a breech block actuating mechanism comprising a body having a plurality of bores, a portion of each forming a gas chamber in communication with a barrel through its port, hollow pistons reciprocable in said bores, means connecting the pistons for joint movement only, operative connections between the pistons and breech block for reciprocating said block, and means coacting with the pistons and with the bores to normally lock the pistons against movement, said locking means releasable to unlock the pistons only when gas is received simultaneously in all the chambers.

5. The invention of claim 4, characterized in that the means for normally locking the pistons comprises spring heads reciprocable in the pistons, each head provided with a conical front face, disks within the pistons connected with and spaced from said heads to form pockets between said heads and disks, the heads having extensions each provided with an auxiliary piston in the chambers, balls seated in the walls of the bores and extending through apertures in the walls of the hollow pistons into engagement with the periphery of said heads, said balls being adapted to drop into the pockets between the heads and disks upon the rearward movement of the heads when said heads are moved by the gas from the piston chambers, to release the pistons and consequently the breech block.

EDWIN H. WALTKE.